(12) United States Patent
Liu et al.

(10) Patent No.: US 12,490,947 B2
(45) Date of Patent: Dec. 9, 2025

(54) VARIABLE TISSUE IMAGING SYSTEM AND METHOD FOR C-ARM FLUOROSCOPY IMAGING SYSTEMS

(71) Applicant: GE Precision Healthcare LLC, Wauwatosa, WI (US)

(72) Inventors: James Liu, Salt Lake City, UT (US); Jon Lea, Salt Lake City, UT (US); Naveen S. Chandra, Salt Lake City, UT (US); Kai Niu, Sandy, UT (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 216 days.

(21) Appl. No.: 18/234,702

(22) Filed: Aug. 16, 2023

(65) Prior Publication Data

US 2025/0057495 A1    Feb. 20, 2025

(51) Int. Cl.
*A61B 6/00* (2024.01)
*A61B 6/46* (2024.01)

(52) U.S. Cl.
CPC ............ *A61B 6/482* (2013.01); *A61B 6/4441* (2013.01); *A61B 6/461* (2013.01); *A61B 6/487* (2013.01)

(58) Field of Classification Search
CPC ........... A61B 6/48; A61B 6/482; A61B 6/486; A61B 6/487; A61B 6/52; A61B 6/5205; A61B 6/5211; A61B 6/5258; A61B 6/025; A61B 6/02; A61B 2090/376; G06T 2207/20224; G06T 2207/10116; G06T 5/50; G06T 2207/10121
See application file for complete search history.

(56) References Cited

U.S. PATENT DOCUMENTS

| 5,949,846 A | 9/1999 | Stein et al. |
| 6,683,934 B1 | 1/2004 | Zhao et al. |
| 7,467,315 B2 | 12/2008 | Spahn |

(Continued)

FOREIGN PATENT DOCUMENTS

GB    2093658 A  *  9/1982  ........... A61B 6/4266

OTHER PUBLICATIONS

MedImaging International staff writers, World's First Dual-Energy Mobile X-Ray System to Increase Imaging Diagnostic Capacity, Apr. 25, 2022.

(Continued)

*Primary Examiner* — Don K Wong
(74) *Attorney, Agent, or Firm* — Boyle Fredrickson, S.C.

(57) ABSTRACT

A system and method for performing a dual energy subtraction imaging process on a fixed or mobile fluoroscopy imaging system for pulmonary imaging applications is provided. The dual energy subtraction image processing system includes a processor configured to operate a radiation source of a fluoroscopy imaging system in a pulsed manner to obtain a number of high energy (HE) frames, to form an HE image from the number of HE frames, to operate the radiation source of the fluoroscopy imaging system in a continuous manner to obtain a number of low energy (LE) frames, to form an LE image from the LE frames, and to employ the HE image and the LE image in a dual energy subtraction imaging process to output a number of enhanced contrast images. The processor is also configured to operate the detector in continuous manner to obtain the HE frames and the LE frames.

18 Claims, 6 Drawing Sheets

(56) References Cited

U.S. PATENT DOCUMENTS 8,942,349 B2 1/2015 Bismuth et al.
2014/0243579 A1 8/2014 Roeske et al.

OTHER PUBLICATIONS

Dietze et al., A compact and mobile hybrid C-arm scanner for simultaneous nuclear and fluoroscopic imaging guidance, Eur Radiol, Jan. 2022, ;32(1):517-523.
Manji et al., Comparison of Dual Energy Subtraction Chest Radiography and Traditional Chest X-Rays in the Detection of Pulmonary Nodules, Quant Imaging Med Surg., Feb. 2016, 6(1):1-5.
Speidel et al., Prototype System for Interventional Dual-Energy Subtraction Angiography, Proc SPIE Int Soc Opt Eng., Feb. 2019, 10951:109511U.
Sabol et al., Development and characterization of a dual-energy chest imaging system based on CsI-a-Si flat panel technology, Proc. SPIE vol. 4320, 399-408.

\* cited by examiner

VARIABLE TISSUE IMAGING SYSTEM AND METHOD FOR C-ARM FLUOROSCOPY IMAGING SYSTEMS

BACKGROUND OF DISCLOSURE

The present disclosure generally relates to a system and method for producing images with enhanced visibility on different types of tissue or implants. Particularly, the present disclosure relates to a system and method for operating a mobile fluoroscopy C-arm imaging system in a dual energy subtraction process.

Visual detection of pulmonary abnormalities on radiographs is extremely challenging. The frequency of missed diagnoses due to the interpretation error has been reported as high as 54%. The complex nature of the superimposed background anatomy is one of the leading contributing causes of such interpretation errors.

Dual-energy subtraction (DES) imaging increases the sensitivity and specificity of pulmonary nodule detection in chest radiography by reducing the contrast of overlying bone structures. Today DES has become a standard imaging mode in most radiographic systems.

In dual energy x-ray imaging techniques, a subject to be imaged is exposed x-rays having different energies by a dual energy x-ray system, such as a radiography imaging system, in order to produce x-ray images of different types of tissue and/or structures disposed within the subject being imaged. The tissues and/or structures located within the subject have varying x-ray attenuations, such that x-rays of different energies will be absorbed differently by different types of tissue and/or structures. One example of a radiography imaging system capable of performing the dual energy subtraction imaging process an exemplary embodiment of the system 10, such as that disclosed in U.S. Pat. No. 6,683,934 entitled Dual Energy X-Ray Imaging System And Method For Radiography And Mammography, the entirety of which is hereby expressly incorporated by reference for all purposes.

When used to obtain images of a mammalian subject, e.g., a human, the differences in the absorption of the low energy x-rays and the high energy x-ray images by the various tissues of the subject, e.g., more dense or hard tissues, i.e., bone, and less dense or soft tissues, i.e., internal organs, enable the dual energy x-ray system to produce images that primarily illustrate tissues of one type or the other. This subtraction or decomposition of the anatomy of the patient being scanned enables each type of tissue to be presented in a separate image, the soft tissue image or the bone image, where one type of tissue is illustrated in a manner to more clearly illustrated the tissue with the other type being removed or subtracted to prevent obscuring of the structures of the desired tissue by structures of the undesired tissue.

In prior art radiography imaging systems utilized for dual energy subtraction imaging procedures, the radiography imaging systems can readily be operated to obtain each of a high energy (HE) image and low energy (LE) image of the patient, as the radiography imaging systems are operable to obtain static images of the patient using each of the voltage requirements for the HE and LE images.

However, while capable of providing images that enable more clear visualization and diagnosis of different types of tissue, the dual energy subtraction imaging system and process presents issues with regard to its implementation on fixed or mobile C-arm fluoroscopy imaging system. More specifically, fixed and mobile C-arm fluoroscopy imaging systems have different operational configurations than radiography imaging systems to facilitate the fluoroscopic or moving images of the anatomy. For example:

1) The duration of both low and high energy x-ray exposures is controlled by AEC (automatic exposure control) in x-ray radiography systems. The mobile C-arm fluoroscopic imaging system operates with AERC (automatic exposure rate control) instead of AEC.
2) The tube current (mA) adjustment in an x-ray radiography system is instantaneous, but it takes much longer, 1 second for instance, in a typical mobile C-arm fluoroscopy imaging system.
3) The maximal power of x-ray generator and tube in a mobile C-arm fluoroscopy imaging system is much less, ⅕ for instance, than that in an x-ray radiography system.
4) The detector dynamic range of a mobile C-arm fluoroscopy imaging system is also much less, 1/20 for instance, than that in an x-ray radiography system.

As a result of these limitations, fixed and mobile C-arm fluoroscopy imaging systems cannot accomplish obtaining the two exposures (LE and HE exposures) in a short period of time, which is critical for pulmonary imaging applications due to, for instance, the breathing motion of the patient being imaged.

Accordingly, a need exists for a system and method that may be utilized on a fixed or mobile C-arm fluoroscopy imaging system to enable the C-arm imaging system to obtain LE and HE images for use in a dual energy subtraction imaging process that overcomes these deficiencies of the prior art.

BRIEF DESCRIPTION OF THE DISCLOSURE

According to an exemplary aspect of the disclosure, a method for performing a dual energy subtraction imaging process on a fluoroscopy imaging system includes the steps of operating a radiation source of the fluoroscopy imaging system to obtain a number of high energy (HE) frames, forming an HE image from the number of HE frames, operating the radiation source of the fluoroscopy imaging system to obtain a number of low energy (LE) frames, forming an LE image from the number of LE frames, and employing the HE image and the LE image in a dual energy subtraction imaging process.

According to one exemplary non-limiting aspect of the disclosure, a fluoroscopy imaging system includes a radiation source, a detector spaced from the radiation source, a processing device operably connected to the detector for receiving image data from the detector in response to the operation of the radiation source and processing the image data to form images, an electronic storage device operably connected to the processing device on which instruction for the operation of the processing device can be stored, and a dual energy subtraction image processing system operably connected to the processing device for performing a dual energy subtraction imaging process and having a processor configured to operate a radiation source of a fluoroscopy imaging system in a pulsed manner to obtain a number of high energy (HE) frames, form an HE image from the number of HE frames, operate the radiation source of the fluoroscopy imaging system in a continuous manner to obtain a number of low energy (LE) frames, form an LE image from the LE frames, and employ the HE image and the LE image in a dual energy subtraction imaging process to output a number of enhanced contrast images.

According to another exemplary non-limiting aspect of the disclosure, a dual energy subtraction image processing system for performing a dual energy subtraction imaging process includes a processor configured to operate a radiation source of a fluoroscopy imaging system to obtain a sequence of alternating high energy (HE) and low energy (LE) frames, and employ the HE image frames and the LE image frames in a dual energy subtraction imaging process to output a sequence of feature enhanced images.

It should be understood that the brief description above is provided to introduce in simplified form a selection of concepts that are further described in the detailed description.

BRIEF DESCRIPTION OF THE DRAWINGS

The drawings illustrate the best mode presently contemplated of carrying out the disclosure. In the drawings.

DETAILED DESCRIPTION

Figure 1:
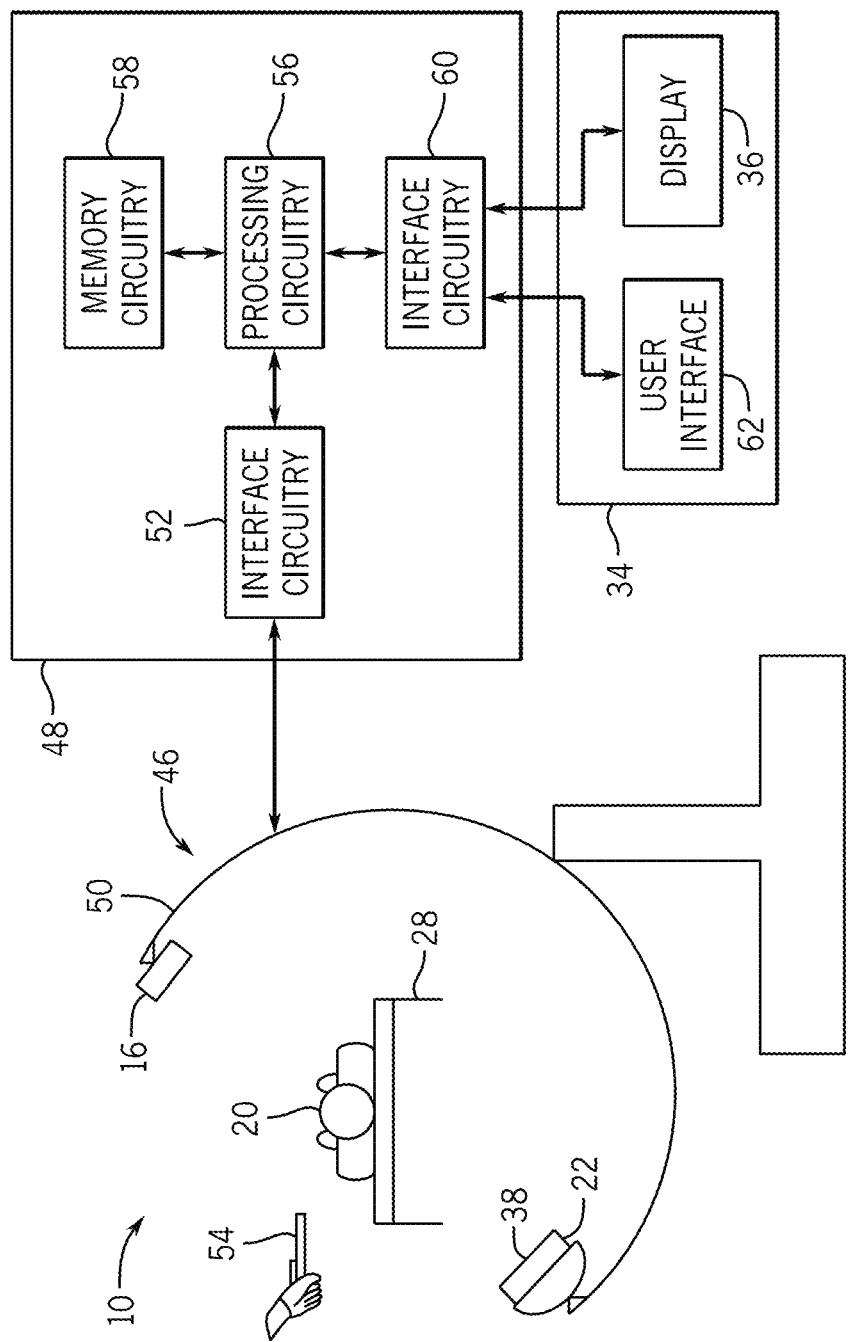
FIG. 1 is a schematic view of an exemplary fixed C-arm fluoroscopy imaging system, according to one exemplary non-limiting embodiment of the disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (i.e., a material, element, structure, number, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

Referring to the figures generally, the present disclosure describes systems and methods for a medical imaging system with a C-arm. The medical imaging system described herein (e.g., the medical imaging system depicted in FIG. 1) may be generally referred to as a fluoroscopic medical imaging system, and in particular a C-arm fluoroscopy imaging system. FIG. 1 illustrates an example of a fixed C-arm fluoroscopy imaging system 10 that includes an X-ray fluoroscopy system 46 for acquiring and processing image data. As illustrated, the fixed C-arm fluoroscopy imaging system 10 includes controller 48 and workstation 34. X-ray fluoroscopy system 46 is illustrated as a C-arm system that includes a C-arm 50, X-ray radiation source 16, and X-ray detector 22. The X-ray radiation source 16 is mounted on the C-arm 50, and the X-ray detector 22 is mounted on the C-arm 50 in an opposing location from the X-ray radiation source 28. While in some systems the X-ray radiation source 16 and the X-ray detector 22 may be fixed, in a typical fluoroscopy system the C-arm 50 allows for movement of the X-ray radiation source 16 and the X-ray detector 22 about the patient 20. In operation, the X-ray radiation source 16 emits a stream of radiation suitable for X-ray fluoroscopy. The X-ray detector 22 receives a portion the stream of radiation from the X-ray source 16 that passes through patient 20 positioned on a table 28. The X-ray detector 22 produces electrical signals that represent the intensity of the radiation stream. As those of ordinary skill in the art will appreciate, these signals are suitably acquired and processed to reconstruct an image of features within the subject.

As previously mentioned, the fixed C-arm fluoroscopy imaging system 10 further includes controller 48. In the illustrated embodiment, controller 48 includes interface circuitry 52 for receiving imaging and tracking data (e.g., to track a medical device 54 such as a surgical device or any other suitable deice for use in a medical procedure), processing circuitry 56, memory circuitry 58, and workstation interface circuitry 60 for communicating with workstation 34. As will be appreciated, one or more computers may be used to implement controller 48. In general, processing circuitry 56, which may typically include a digital signal processor, a CPU or the like, may process the tracking data so that the location of the device 54 may be projected onto the reconstructed image. In addition, processing circuitry 42 also may process the imaging data (e.g., image data and offset data) to reconstruct the data into a meaningful diagnostic image. Memory circuitry 58 may serve to save the imaging and tracking data as well as other system parameters.

As illustrated, the fixed C-arm fluoroscopy imaging system 10 further includes the workstation 34, which includes a user interface 62 and display 36. The user interface 62 may include a keyboard and/or mouse, as well as other devices such as printers or other peripherals for reproducing hardcopies of the reconstructed images. Display 36 may include one or more screens. For example, the display 36 may include a first screen for displaying a previously acquired image and a second screen for displaying one or more intra-operative images.

Figure 2:
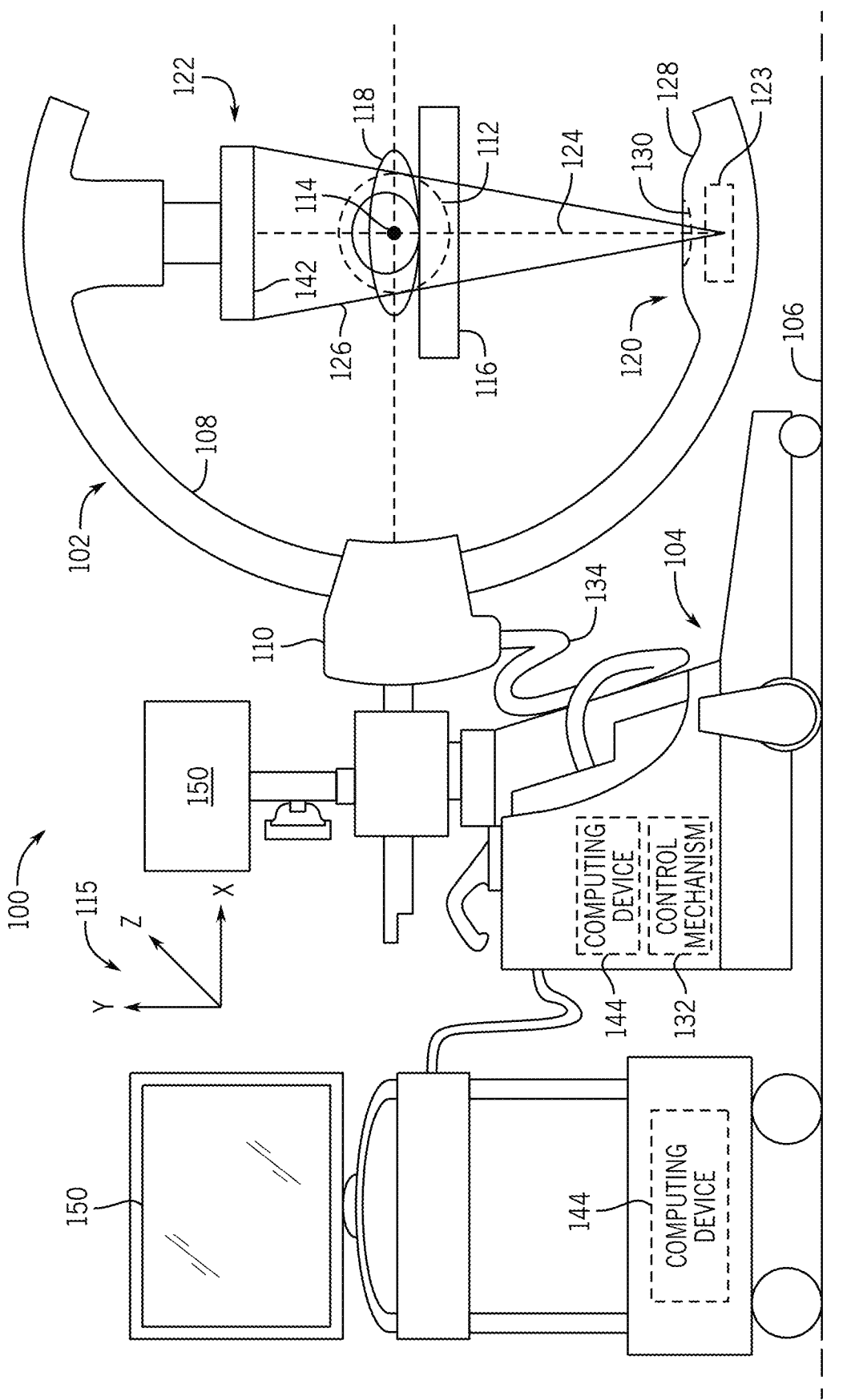
FIG. 2 is a side elevation view of an exemplary mobile C-arm fluoroscopy imaging system, according to one exemplary non-limiting embodiment of the disclosure.

Referring now to FIG. 2, a mobile C-arm fluoroscopic imaging system 100, such as that disclosed in US Published Patent Application Serial No. US2022/0401048, entitled Imaging System With Carbon Fiber C-Arm, the entirety of which is expressly incorporated herein by reference for all purposes, is shown in accordance with an exemplary embodiment. The mobile C-arm fluoroscopic imaging system 100 includes a rotatable C-arm 102 that is connected to a base 104. The base 104 supports the C-arm 102 while the C-arm 102 is stationary and while rotating. The base 104 supports the C-arm 102 on a ground surface 106 on which the mobile C-arm fluoroscopic imaging system 100 sits via a number of wheels 105 or similar rotatable supports that enable the base 104 to be readily moved over and/or along the surface 106 by an operator, such as by grasping handles 107 on the base 104 and pulling or pushing the mobile C-arm fluoroscopic imaging system 100 into the desired position for the operation of the mobile C-arm fluoroscopic imaging system 100. The C-arm 102 includes a C-shaped portion 108 that is connected to an extended portion 110. The extended portion 110 is rotatably coupled to the base 104 which allows the C-arm 102 to rotate about an examination region 112 and a rotational axis 114. For example, the C-arm 102 may be configured to rotate at least 180° in opposing directions relative to the base 104, though in some embodiments, the C-arm 102 may be configured to rotate at least 220°. Configuring the C-arm 102 to rotate at least 220° may provide a physician with greater access to a patient being imaged. While the following describes the rotation of the C-arm 102 as rotating in the X and Y directions of the Cartesian coordinate system 115 (i.e., rotating the C-shaped portion 108 such that opposing ends of the C-shaped portion 108 are closer to or further from the extended portion 110 in various positions), it is understood that the C-arm 102 may also rotate in the Z direction (i.e., rotating the C-shaped portion 108 such that opposing ends of the C-shaped portion 108 are closer to or further from a head of the patient within the examination region 112 in various position and/or changing the elevation of the extended portion 110 relative to the base 104 employing a suitable vertical translation mechanism (not shown) disposed on the base 104 and engaged with the extended portion 110.

The mobile C-arm fluoroscopic imaging system 100 further includes a patient support 116 (i.e., couch, bed, table, etc.) that supports an object or patient, such as a patient 118 while at least a portion of the patient 118 is within the examination region 112. The mobile C-arm fluoroscopic system 100 additionally includes a radiation source 120 and a radiation detector 122. The radiation source 120 and the radiation detector 122 are supported by and rotate with the C-arm 102. Furthermore, the radiation source 120 and the radiation detector 122 are positioned at opposite ends of the C-shaped portion 108 of the C-arm 102 along axis 124, where axis 124 intersects and extends radially relative to the rotational axis 114. The C-shaped portion 108 may be rotated as described above in order to adjust the position of the radiation source 120 and the radiation detector 122 to obtain 2D projection images of the subject 118 at each selected orientation of the radiation source 120 relative to the detector 122 in order to form a 2D projection dataset. Furthermore, in the embodiment depicted in FIG. 2, the position of the radiation detector 122 may be varied such that the radiation detector 122 is placed further from or closer to the radiation source 120.

During a medical imaging procedure, a portion of the patient 118 is within the examination region 112 and the radiation source 120 emits radiation 126. In one embodiment, the radiation source 120 may include an X-ray tube 123 housed within a casing 128. The X-ray tube 123 generates the radiation 126 which escapes the casing 128 via an outlet 130. The radiation 126 traverses the examination region 112 and is attenuated by the portion of the patient 118 that is within the examination region 112. Specifically, the radiation source 120 emits the radiation 126 towards the radiation detector 122 which is on the opposite end of the C-arm 102. The radiation source 120 emits cone-shaped radiation which is collimated to lie within an X-Y-Z plane of the Cartesian coordinate system 115 which is generally referred to as an "object plane" which is parallel to the radiation detector 122 at an isocenter of the C-arm 102.

After passing through a portion of the patient 118, the attenuated radiation is captured by the radiation detector 122. In some embodiments, the radiation detector 122 includes a plurality of detector elements (not shown) that acquire projection data. Each detector element produces an electrical signal that is a measurement of the attenuation at the detector element location. The attenuation measurements from all the detector elements in the detector 122 are acquired separately to produce a transmission profile. In one embodiment, the radiation detector 122 is fabricated in a flat panel configuration including a plurality of detector elements.

When the radiation source 120 and the radiation detector 122 are rotated with the C-arm 102 within the object plane and around the patient 118, the angle at which the radiation 126 intersects the patient 118 changes. A group of attenuation measurements (i.e., projection data) form the radiation detector 122 at one C-arm angle is referred to a "view." A "scan" of the patient 118 includes a set of projection views made at different angles, or view angles, during rotation of the C-arm 102. As used herein, the term view is not limited to the use described herein with respect to projection data obtained from or from one C-arm 102 angle. The term view is used to mean one data acquisition whenever there are multiple acquisitions from different angles, such as used to form the 2D projection dataset.

The mobile C-arm fluoroscopic imaging system 100 further includes a control mechanism 132 that is housed within the base 104. The control mechanism 132 is connected to the C-arm 102, the radiation source 120, and the radiation detector 122 via a cable 134 which allows the control mechanism to send data to/receive data from the C-arm 102, the radiation source 120, and the radiation detector 122. The control mechanism 132 controls the rotation of the C-arm 102 and the operation of the radiation source 120. While FIG. 2 depicts the base 104 as including the control mechanism 132, in other embodiments the control mechanism may be separate from the base 104 (i.e., in a different room).

The C-arm 102 may be adjusted to a plurality of different positions by rotation of the C-shaped portion 108. For example, the radiation detector 122 may be positioned vertically above the radiation source 120 relative to the surface 106 on which the mobile C-arm fluoroscopic system 100 sits, with axis 124 arranged normal to the surface 106 intersecting a midpoint of the outlet 130 of the radiation source 120 and a midpoint of a detector surface 142 of the radiation detector 122. The C-arm motor controller 138 and a guide system within the extended portion 110 may adjust the C-shaped portion 108 from the first position to a different second position by rotating the C-shaped portion 108 via a coupling between the guide system and the C-shaped portion 108. In one example, the second position may be a position in which the radiation source 120 and the detector 122 are rotated 180° together relative to the first position such that the radiation source 120 is positioned vertically above the radiation detector 122, with the axis 124 intersecting the midpoint of the outlet 130 of the radiation source 120 and the midpoint of the detector surface 142 of the radiation detector 122. When adjusted to the second position, the radiation source 120 may be positioned vertically above the rotational axis 114 of the C-shaped portion 108 and the radiation detector 122 may be posited vertically below the rotational axis 114.

The mobile C-arm fluoroscopic imaging system 100 further includes a computing device 144 that is housed within the base 104 that is operable to generate images for presentation on a display 150. While FIG. 2 depicts the computing device 144 as housed within the base 104, in other embodiments the computing device 144 may be remote from the rest of the mobile C-arm fluoroscopic imaging system 100. As used herein, a computing device (or system) is any device/system capable of processing, storing, and/or transmitting data (i.e., tablet, handheld device, smartphone, personal computer, laptop, network computer, server, mobile communication device, etc.). The computing device 144 may be connected to a network (i.e., a wide area network (WAN), a local area network (LAN), a public network (the internet), etc.) which allows the computing device 144 to communicate with other devices on a same network. In some embodiments, the network may be regarded as a private network and may include, for example, a virtual private network.

Figure 3:
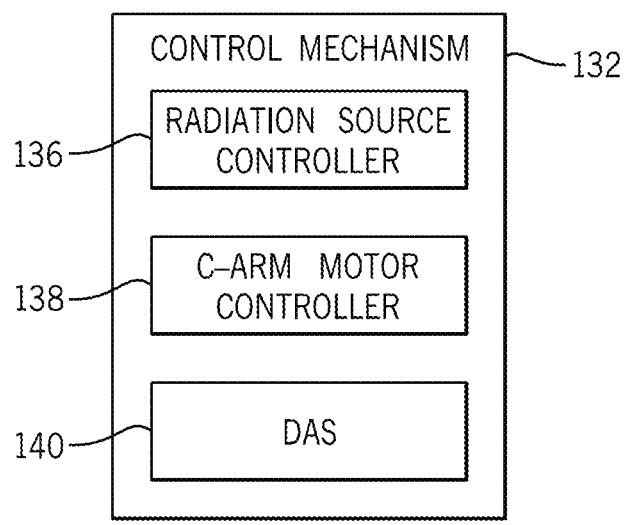
FIG. 3 is a block diagram of a control mechanism for the C-arm fluoroscopy imaging systems of FIGS. 1 and 2 according to one exemplary non-limiting embodiment of the disclosure.

Briefly turning to FIG. 3, a block diagram of the computing device 144 is shown in accordance with an exemplary embodiment. The computing device 144 includes a processing device 146 and a system memory 148. In some embodiments, the computing device is connected to a display 150 and one or more user input devices, e.g., a touchscreen, a keyboard, a mouse, etc., and/or external devices 152. The processing device 146 is in communication with the system memory 148 and may execute computer readable program instructions stored in the system memory 148. As used herein, a processor may include a central processing unit (CPU), or other electronic components capable or executing computer readable program instructions (i.e., a digital signal processor, a field-programmable gate array (FPGA), a graphics processing unit (GPU), etc.). Furthermore, as used herein, a processor may include two or more of a CPU, a digital signal processor, an FPGA, and a GPU.

The system memory 148 is a computer readable storage medium. As used herein, a computer readable storage medium is any device that stores computer readable program instructions for execution by a processor and is not construed as transitory per se. Computer readable program instructions include programs, logic, data structures, modules, etc. that when executed by a processor create a means for implementing functions/acts. Computer readable program instructions when stored in a computer readable storage medium and executed by a processor direct a computer system and/or another device to function in a particular manner such that a computer readable storage medium comprises an article of manufacture. System memory as used herein includes volatile memory (i.e., random access memory (RAM) and dynamic RAM (DRAM)) and non-volatile memory (i.e., flash memory, read-only memory (ROM), magnetic computer storage devices, etc.). In some embodiments the system memory 148 may further include cache.

In one embodiment, the various methods and processes may be stored as computer readable program instructions in the system memory 148. In this embodiment, the system memory 148 includes computer readable program instructions for imaging a patient with a medical imaging system (i.e., the radiography imaging system 100).

The external devices 152 include devices that allow a user to interact with/operate the computing device 144 (i.e., mouse, keyboard, touchscreen, speakers, etc.), and can include the display 150 when configured as a touchscreen device. In some embodiments, the display 150 displays a graphical user interface (GUI). The GUI includes editable fields for inputting data (i.e., patient data, imaging parameters, etc.) and further includes selectable icons. Selecting an icon and/or inputting data causes the processing device 146 to execute computer readable program instructions stored in the system memory 148 which causes the processor to perform a task. For example, a user of the computing device 144 may use an external device 152 or the touchscreen display 150 to select a "start" icon or the like which causes the processing device 146 to being a medical imaging procedure and/or analysis according to one or more embodiments as disclosed herein.

Mobile C-arm fluoroscopic imaging system 100 may include one computing device 144. The computing device 144 may be used for inputting or outputting imaging parameters, requesting examinations, plotting data, and/or viewing images. Furthermore, in certain embodiments, the mobile C-arm fluoroscopic imaging system 100 may be coupled to multiple displays, printers, workstations, and/or similar devices located either locally or remotely (i.e., within an institution or hospital or in a an entirely different location, etc.) via one or more configurable wired and/or wireless networks. Furthermore, in some embodiments, the base further house an internal power source (not shown) that provides electrical power to operate the mobile C-arm fluoroscopic imaging system 100. Alternatively, the base 104 may be connected to an external power source to power the mobile C-arm fluoroscopic imaging system 100. A plurality of connection cables may (i.e., cable 134) may be provided to transmit electrical power to the radiation source 120, the radiation detector 122, etc.

The computing device 144 is in communication with and provides commands to the radiation source controller 136, the C-arm motor controller 138, and the DAS 140 for controlling system operations such as data acquisition and/or data processing. In some embodiments, the computing device 144 controls operation of the radiation source controller 136, the C-arm motor controller 138, and the DAS 140 based on a user input.

Figure 7:
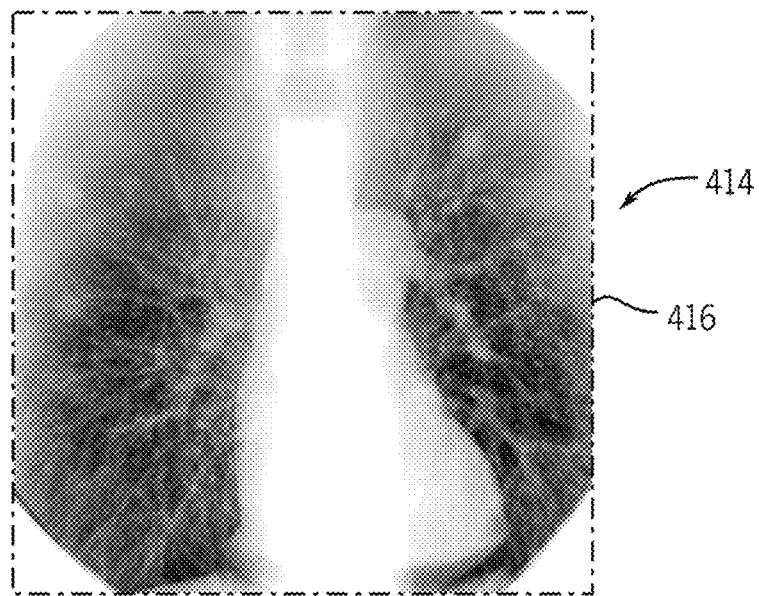
FIG. 7 is a soft tissue image produced by the dual energy subtraction image processing system, according to one exemplary non-limiting embodiment of the disclosure.

Computing device 144 also includes a dual energy subtraction (DES) image processing system 160, that is configured to receive an image dataset, such as a 2D projection image dataset/transmission dataset (not shown), from the detector 120 and to implement a dual energy subtraction process described herein to generate images 200,202 (FIGS. 7 and 8) that each enhance different types of tissues and/or materials present within the 2D projection image dataset/transmission dataset. The DES image processing system 160 may be implemented as a piece of hardware that is installed in the processing device 146. Optionally, the DES image processing system 160 may be implemented as a set of instructions that are installed on the processing device 146. The set of instructions may be stand-alone programs, may be incorporated as subroutines in an operating system installed on the processing device 146, and/or in system memory 148 to be accessed by the processing device 146, may be functions that are installed in a software package on the processing device 146, or may be a combination of software and hardware. It should be understood that the various embodiments are not limited to the arrangements and instrumentality shown in the drawings.

Figure 4:
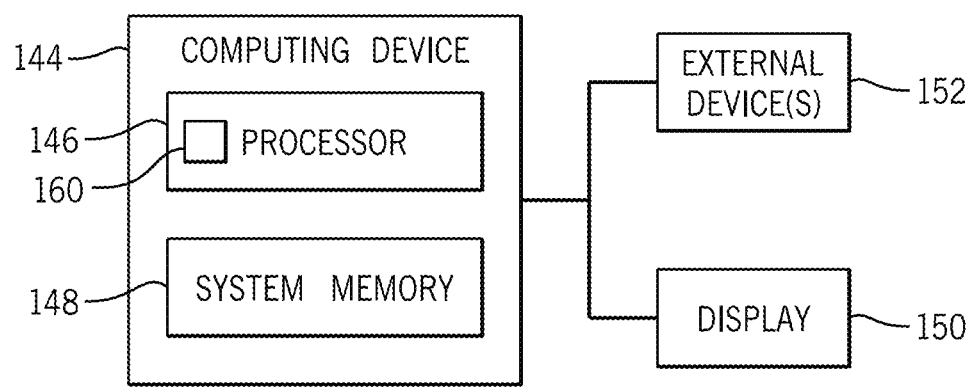
FIG. 4 is a block diagram of a computing device for the C-arm fluoroscopy imaging systems of FIGS. 1 and 2 according to one exemplary non-limiting embodiment of the disclosure.
Figure 5:
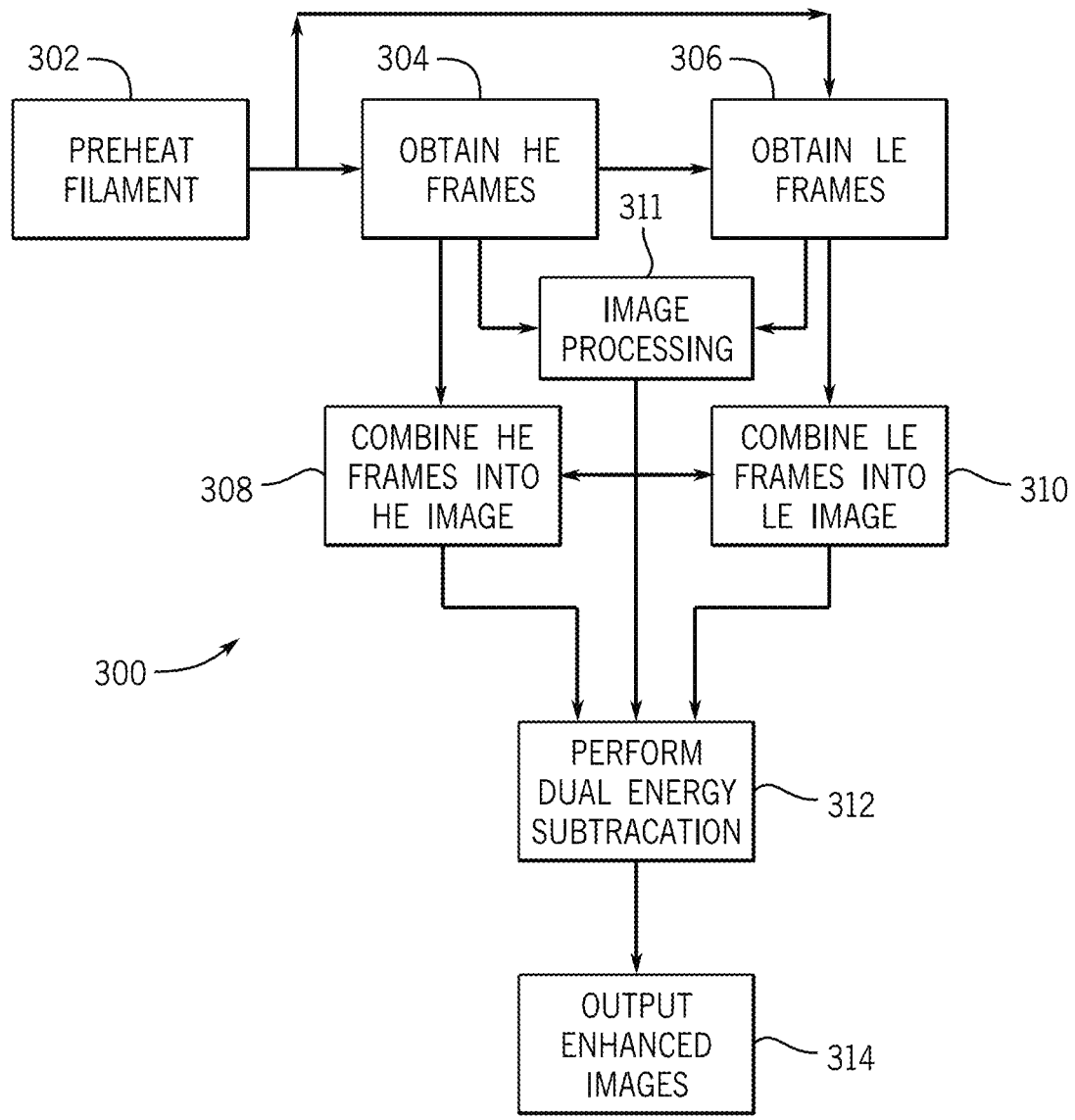
FIG. 5 is a flowchart of the operation of a dual energy subtraction image processing system employed on the C-arm fluoroscopy imaging systems of FIGS. 1 and 2, according to one exemplary non-limiting embodiment of the disclosure.
Figure 6:
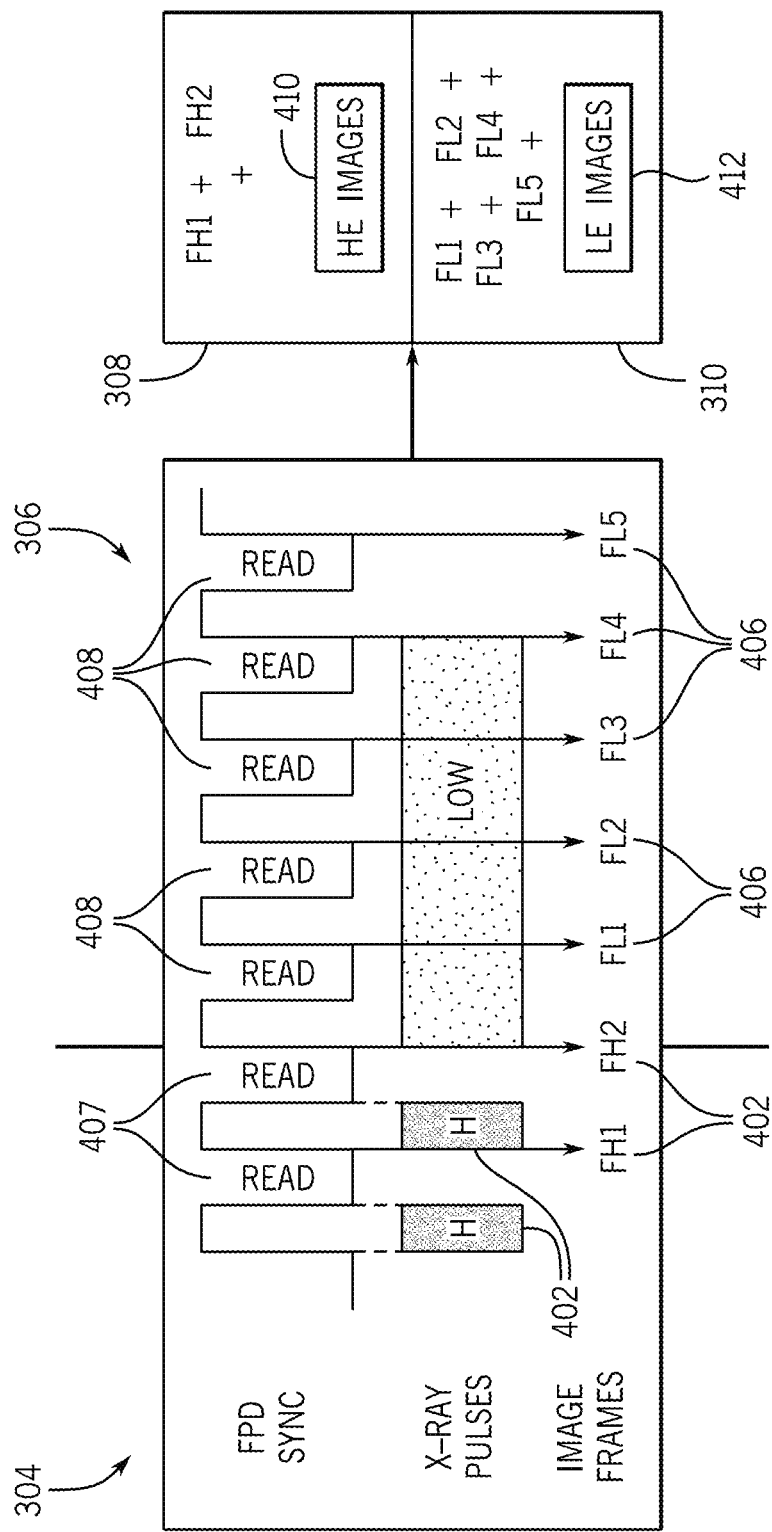
FIG. 6 is a schematic view of the operation of the dual energy subtraction image processing system, according to one exemplary non-limiting embodiment of the disclosure.

Looking now at FIGS. 4-6, the DES image processing system 160 operates the radiation source 16,120 to emit radiation 126 that passes through the patient 20,118 prior to reaching the detector 22,122. In the operation of the DES image processing system 160, the radiation source 16,120 is operated at two different voltages within a range of between about 30 kVp to about 140 kVp in order to obtain a low energy (LE) image, 60 kVp for instance, and a high energy (HE) image, 120 kVp for instance. In yet another embodiment, the LE and HE images may be obtained by applying different filtrations on the x-ray beam generated with the same kVp. These images can be employed by the computing device 144 within a subtraction process to generate one or more enhanced contrast images providing better representation of different types of tissue(s) and/or material(s) present within the LE and HE images. While many subtraction processes are currently in use for this purpose, one example of such a subtraction process is disclosed in U.S. Pat. No. 10,147,171, entitled System and Methods For Generating Subtracted Images, the entirety of which is expressly incorporated herein by reference for all purposes.

Figure 8:
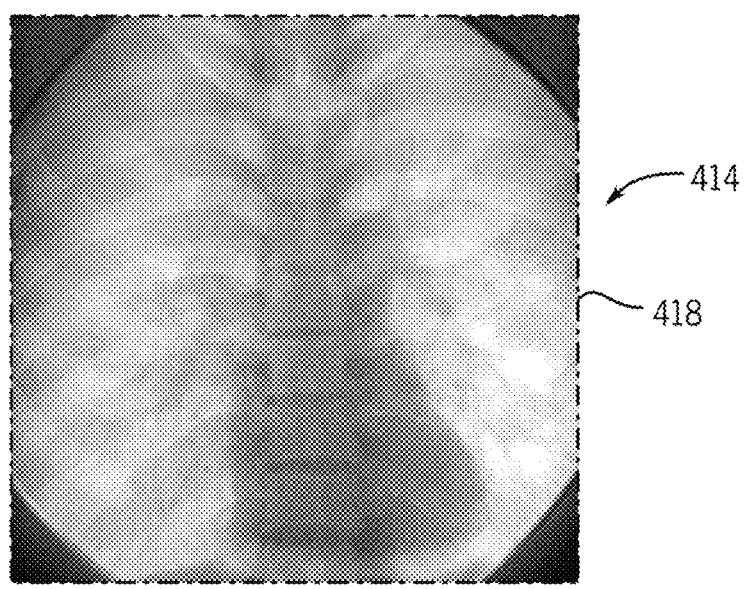
FIG. 8 is a bone tissue image produced by the dual energy subtraction image processing system, according to one exemplary non-limiting embodiment of the disclosure.

The types of tissue(s) and/or material(s) that can be represented within the enhanced contrast images produced by the subtraction process can include, but are not limited to soft tissues of the patient anatomy, bony tissues of the patient anatomy, and different types of materials and/or medical devices positioned within the patient anatomy, such as stents, that can be formed of those different materials, e.g., metals and polymeric materials, including nylon. For example, in one exemplary embodiment the dual energy subtraction process employed on the LE and HE images can produce an enhanced contrast image(s) that enhances the contrast and visibility of certain structures, e.g., the lung cancer nodules, in a soft-tissue image, such that the enhanced contrast image(s) output by the DES image processing system 160 include an enhanced contrast soft-tissue image 416 (FIG. 7) and an enhanced contrast bone image 418 (FIG. 8). In another exemplary embodiment, the DES image processing system 160 can output enhanced contrast image(s) to enhance the contrast and visibility of nylon stents, which have been more and more used in the vascular procedures and are very hard to visualize in the regular fluoroscopic images. In still another exemplary embodiment, the DES image processing system 160 can output image(s) to enhance the visualization of metal within the imaged patient anatomy, as compared to the bony and/or soft-tissue background, such as in a situation where a stent in the imaged patient anatomy is formed of a metal. To provide this enhanced visualization, the enhanced contrast image(s) output by the DES image processing system 160 can include an enhanced contrast material, e.g., metal, image and a background (soft-tissue and/or bony) enhanced contrast image.

In order to obtain the LE and HE images utilized by the DES image processing system 160 to produce the enhanced contrast images, referring now to the exemplary embodiments shown in FIGS. 5 and 6, according to the method 300 upon initiation of a dual energy imaging procedure by a user, in step 302 the DES image processing system 160 will pre-heat the filament within the radiation source 16,120 before the exposure starts to ensure that the filament is heated to the desirable temperature such that the produced tube mA is close to a recommended value. The pre-heating in step 302 compensates for the slower mA response in the C-arm fluoroscopy imaging systems 10,100 before the exposure and maximizes the radiation source 120/X-ray tube 123 capacity by setting the maximal mA during the exposure. Further, detector saturation can be avoided by adjusting the high-energy shot pulse width based on the obtained patient size as determined by a previously obtained fluoroscopy procedure, or a pre-shot image if it has no previous fluoroscopy image/cine is available and as a result of the lack of an automatic exposure control (AEC) system present on the C-arm fluoroscopic imaging systems 10,100.

After pre-heating, in step 304 the DES image processing system 160 performs one or more pulses 402 of the radiation source 16,120 at a high energy or voltage, e.g., approximately 120 kVp, to emit radiation/X-rays from the radiation source 16,120 during the pulses to obtain one or more HE frames 404. As shown in FIG. 6, within the intervals 407 between each HE pulse 402, the detector 20,122 is read to obtain the corresponding HE frame 404.

After reading the detector following the final HE pulse 402 to obtain last HE frame 404, in step 306 the DES image processing system 160 operates the radiation source 16,120 at low energy or voltage, e.g., approximately 60 kVp, to obtain one or more LE frames 406. The operation of the radiation source 16,120 in step 306 is continuous to minimize the total x-ray duration, i.e., the emission of radiation/X-rays from the radiation source 16,120 is continuous throughout step 306. At specified time intervals 408 during the continuous operation of the radiation source 16,120 at low energy, the DES image processing system 160 reads the detector 22,122, such as at predetermined intervals, to obtain the LE frames 406. As shown in the exemplary embodiment of FIG. 6, the initial LE frame 406 and the final LE frame 406 obtained can be partial frames that can be combined to form a complete LE frame 406. In one exemplary embodiment, the interval(s) 407 between the HE pulses 402 where the detector 22,122 is read to obtain the HE frames 404 is equivalent to the intervals 408 between the reading of the detector 22,122 to obtain the LE frames 406, such that the detector 22,122 is operated or read in a continuous and/or consistent manner throughout the entire imaging process for obtaining HE frames 404 and the LE frames 406.

In step 308, which can be performed during or subsequent to obtaining the LE frames 406 in step 306, the HE frame(s) 404 are formed by the DES image processing image processing system 160 into an HE image 410. In the exemplary embodiment shown in FIGS. 5 and 6, the HE image 410 is formed from the combination of the two HE frames 404, such as by accumulating the image information in each HE frame 404 into a single HE image 410 in any suitable known manner.

In step 310, which can occur concurrently or consecutively to the formation of the HE image 410 in step 308, the LE frames 406 are similarly combined with one another by the DES image processing system 160 to form an LE image 412. Both the HE image 410 and the LE image 412 can then be subsequently employed within a dual energy subtraction process performed by the DES image processing system 160 in step 312, such as that described previously, in order to output one or more enhanced contrast images 414 in step 314. As also stated previously, the enhanced contrast images 414, with examples shown in FIGS. 7 and 8 of a soft tissue image 416 and a bone tissue image 418, can be formed to provide the desired enhanced contrast between a number of different types of tissue(s) and/or material(s) present within the patient anatomy contained within the HE image 410 and LE image 412. The output enhanced contrast images 414, 416,418 can be presented by the DES image processing system 160 on the display 36,150 for the C-arm fluoroscopy imaging system 10,100, e.g., simultaneously, for review by the user.

In an alternative exemplary embodiment, the DES image processing system 160 can operate the radiation source 16,120 in a manner to obtain the LE frames 406 prior to the obtaining the HE frames 404. In still another alternative exemplary embodiment, referring again to FIG. 5, the DES image processing system 160 can operate the radiation source 16,120 (e.g., in a pulsed manner) to obtain a sequence of alternating high energy (HE) frames 404 and low energy (LE) frames 406, or vice versa, to form associated pairs of individual HE frame(s) 404 and individual LE frame(s) 406, with a subsequent image processing step 311 performed on the pairs of HE frames 404 and/or LE frames 406. The image processing performed in step 311 on the pairs of frames 404 and 406 can be any suitable image processing step, such as, but not limited to, noise reduction on the frames 404,406. Each pair of associated and image processed HE frame(s) 404 and LE frame(s) 406 is then employed as the HE image 410 and the LE image 412, respectively, in the subsequent dual energy subtraction step 312 to produce one or more feature enhanced image(s) 414,416,418 for each pair of associated frames 404,406 that are output in step 314.

With the DES image processing system 160 and associated method 300, the duration of the process of FIG. 6 performed by the C-arm fluoroscopy imaging system 10,100 for obtaining the HE frames 404 and LE frames 406 is minimized by operating the detector 22,122 at constant rate without switching the operational mode of the detector 22,122 between the pulsed high energy x-ray exposures and the continuous low energy x-ray exposures. In one exemplary embodiment, the total duration of the X-ray exposure in the method 300 is no longer than 200 milliseconds, which is critical to ensure image quality in the presence of breathing motion by the patient 20,118. Further, the DES image processing system 160 and associated method 300 accommodates each of the operational differences or shortcomings in a C-arm fluoroscopic imaging system 10,100 from radiography systems, including the slower tube mA response, lower detector dynamic range, lower tube power, and lack of hardwired AEC (automatic expose control) in order to enable a dual energy subtraction imaging process to be performed using the C-arm fluoroscopy imaging system 10,100 particularly with respect to pulmonary imaging applications.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for performing a dual energy subtraction imaging process on a fluoroscopy imaging system, the method comprising the steps of:
   a. operating a radiation source of the fluoroscopy imaging system to obtain a number of high energy (HE) frames;
   b. forming an HE image from the number of HE frames;
   c. operating the radiation source of the fluoroscopy imaging system to obtain a number of low energy (LE) frames;
   d. forming an LE image from the number of LE frames; and
   e. employing the HE image and the LE image in a dual energy subtraction imaging process, wherein the step of operating the radiation source of the fluoroscopy imaging system to obtain the number of HE frames comprises operating the radiation source of the fluoroscopy imaging system in a pulsed manner to obtain the number of HE frames, and wherein the step of operating the radiation source of the fluoroscopy imaging system in a pulsed manner to obtain the number of HE frames further comprises reading a detector between pulses to obtain the number of HE frames.

2. A method for performing a dual energy subtraction imaging process on a fluoroscopy imaging system, the method comprising the steps of:
   a. operating a radiation source of the fluoroscopy imaging system to obtain a number of high energy (HE) frames;
   b. forming an HE image from the number of HE frames;
   c. operating the radiation source of the fluoroscopy imaging system to obtain a number of low energy (LE) frames;
   d. forming an LE image from the number of LE frames; and
   e. employing the HE image and the LE image in a dual energy subtraction imaging process,
wherein the step of operating the radiation source of the fluoroscopy imaging system to obtain the number of HE frames comprises operating the radiation source of the fluoroscopy imaging system in a pulsed manner to obtain the number of HE frames, and wherein the step of operating the radiation source of the fluoroscopy imaging system to obtain a number of low energy (LE) frames comprises operating the radiation source of the fluoroscopy imaging system in a continuous manner to obtain the number of LE frames.

3. The method of claim 2, wherein the step of operating the radiation source of the fluoroscopy imaging system in a continuous manner to obtain the number of LE frames further comprises reading a detector at predetermined intervals to obtain the number of LE frames.

4. The method of claim 3, wherein the predetermined intervals during operating the radiation source of the fluoroscopy imaging system in a continuous manner to obtain the number of LE frames are equivalent to intervals between HE pulses.

5. The method of claim 1, wherein a total length of time for operating a radiation source of the fluoroscopy imaging system to obtain the number of HE frames and for operating the radiation source of the fluoroscopy imaging system to obtain the number of LE frames does not exceed 200 ms.

6. The method of claim 1, wherein the step of forming the HE image from the number of HE frames comprises combining the HE frames into the HE image.

7. The method of claim 6, wherein the step of forming the LE image from the number of LE frames comprises combining the LE frames into the LE image.

8. The method of claim 1, further comprising the step of outputting at least one enhanced contrast image after employing the HE image and the LE image in a dual energy subtraction imaging process.

9. The method of claim 8, wherein the at least one enhanced contrast image comprises:
   a. an enhanced contrast material image; and
   b. an enhanced contrast background image.

10. The method of claim 9, wherein the enhanced contrast material image is an enhanced contrast metal image or an enhanced contrast polymeric material image.

11. The method of claim 1, further comprising the steps of:
   a. alternating the operation of the radiation source of the fluoroscopy imaging system to obtain a number of pairs of associated high energy (HE) frames and low energy (LE) frames;
   b. performing image processing on the high energy (HE) frame and low energy (LE) frame of each associated pair;
   c. forming an HE image from the processed HE frame;
   d. forming an LE image from the processed LE frame;
   e. performing a subtraction imaging process on the HE image and the LE image to produce an enhanced image; and
   f. displaying the enhanced image.

12. The method of claim 1, wherein the fluoroscopic imaging system is selected from the group of a fixed C-arm fluoroscopic imaging system and a mobile C-arm fluoroscopic imaging system.

13. A dual energy subtraction image processing system for performing a dual energy subtraction imaging process, the dual energy subtraction image processing system comprising a processor configured to:
   a. operate a radiation source of a fluoroscopy imaging system to obtain a number of high energy (HE) frames;
   b. form an HE image from the number of HE frames;
   c. operate the radiation source of the fluoroscopy imaging system to obtain a number of low energy (LE) frames;
   d. form an LE image from the LE frames; and
   e. employ the HE image and the LE image in a dual energy subtraction imaging process to output a number of enhanced contrast images,
wherein the processor is configured to read a detector between pulses to obtain the number of HE frames.

14. A dual energy subtraction image processing system for performing a dual energy subtraction imaging process, the dual energy subtraction image processing system comprising a processor configured to:
   a. operate a radiation source of a fluoroscopy imaging system to obtain a number of high energy (HE) frames;
   b. form an HE image from the number of HE frames;
   c. operate the radiation source of the fluoroscopy imaging system to obtain a number of low energy (LE) frames;
   d. form an LE image from the LE frames; and
   e. employ the HE image and the LE image in a dual energy subtraction imaging process to output a number of enhanced contrast images,
wherein the processor is configured to:
   a. operate the radiation source of the fluoroscopy imaging system in a pulsed manner to obtain the number of HE frames; and
   b. operate the radiation source of the fluoroscopy imaging system in a continuous manner to obtain the number of LE frames.

15. The dual energy subtraction image processing system of claim 13, wherein the processor is configured to read the detector at predetermined intervals to obtain the number of HE frames and the number of LE frames.

16. A fluoroscopy imaging system comprising:
   a. a radiation source;
   b. a detector spaced from the radiation source;
   c. a processing device operably connected to the detector for receiving image data from the detector in response to the operation of the radiation source and processing the image data to form images;
   d. an electronic storage device operably connected to the processing device on which instruction for the operation of the processing device can be stored; and e. a dual energy subtraction image processing system operably connected to the processing device for performing a dual energy subtraction imaging process, the dual energy subtraction image processing system comprising a processor configured to:
  i. operate a radiation source of a fluoroscopy imaging system in a pulsed manner to obtain a number of high energy (HE) frames;
  ii. form an HE image from the number of HE frames;
  iii. operate the radiation source of the fluoroscopy imaging system in a continuous manner to obtain a number of low energy (LE) frames;
  iv. form an LE image from the LE frames; and
  v. employ the HE image and the LE image in a dual energy subtraction imaging process to output a number of enhanced contrast images, wherein the processor is configured to read the detector between pulses to obtain the number of HE frames.

17. The fluoroscopic imaging system of claim 16, wherein the processor is configured to operate the detector in an alternating manner to obtain each of the number of HE frames and the number of LE frames.

18. The fluoroscopic imaging system of claim 16, wherein the fluoroscopic imaging system is selected from the group of a fixed C-arm fluoroscopic imaging system and a mobile C-arm fluoroscopic imaging system.

* * * * *